United States Patent
Jahns et al.

(10) Patent No.: US 7,166,355 B2
(45) Date of Patent: Jan. 23, 2007

(54) USE OF MICROCAPSULES IN GYPSUM PLASTERBOARDS

(75) Inventors: Ekkehard Jahns, Weinheim (DE); Hans-Jurgen Denu, Friedelsheim (DE); Joachim Pakusch, Speyer (DE); Horst Seibert, Fussgoenheim (DE); Marco Schmidt, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 9 days.

(21) Appl. No.: 10/485,267

(22) PCT Filed: Aug. 7, 2002

(86) PCT No.: PCT/EP02/08812

§ 371 (c)(1),
(2), (4) Date: Feb. 10, 2004

(87) PCT Pub. No.: WO03/016650

PCT Pub. Date: Feb. 27, 2003

(65) Prior Publication Data

US 2004/0234738 A1    Nov. 25, 2004

(30) Foreign Application Priority Data

Aug. 16, 2001  (DE) ............................... 101 39 171

(51) Int. Cl.
*B32B 5/16* (2006.01)

(52) U.S. Cl. ................... 428/402.21; 428/402.22; 428/402.24; 524/801; 524/802; 427/372.2

(58) Field of Classification Search ........... 428/402.21, 428/402.22, 402.24; 524/801, 802; 427/372.2
See application file for complete search history.

(56) References Cited

U.S. PATENT DOCUMENTS

| 4,259,401 | A | * | 3/1981 | Chahroudi et al. ......... 52/302.3 |
| 4,448,639 | A | * | 5/1984 | Long ........................... 162/124 |
| 4,587,279 | A | * | 5/1986 | Salyer et al. ................ 523/206 |
| 4,747,240 | A | | 5/1988 | Voisinet et al. |
| 4,988,543 | A | * | 1/1991 | Houle et al. ............. 427/372.2 |
| 5,456,852 | A | | 10/1995 | Isiguro |
| 5,501,268 | A | | 3/1996 | Stovall et al. |
| 5,596,051 | A | * | 1/1997 | Jahns et al. .................... 526/73 |
| 6,200,681 | B1 | * | 3/2001 | Jahns et al. ............ 428/402.24 |

FOREIGN PATENT DOCUMENTS

| DE | 196 54 035 | 6/1997 |
| DE | 199 54 772 | 5/2001 |
| EP | 418 470 | 3/1991 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

The invention relates to the use of microcapsules with latent heat storage materials as capsule cores on gypsum plasterboards, gypsum plasterboards containing the same and a method for production thereof.

15 Claims, No Drawings

USE OF MICROCAPSULES IN GYPSUM PLASTERBOARDS

BACKGROUND OF THE INVENTION

1. Field of the Invention

The present invention relates to the use of microcapsules comprising latent heat storage materials as capsule core in plasterboard, to the plasterboard in which they are present and to a process for producing this plasterboard.

2. Description of the Background

An important focus of research for reducing energy requirements and for utilizing available heat energy are latent heat storage materials. They have a variety of uses, for example as heat transfer media in heating and cooling systems or for the storage of heat in insulation materials or building materials. Their function is based on the enthalpy change associated with the solid/liquid phase transition, which results in absorption of energy from the surroundings or release of energy into the surroundings. They can thus firstly be used for keeping the temperature constant within a prescribed temperature range and, secondly, can improve thermal insulation in a suitable arrangement.

DE-A 19 654 035 describes microcapsules as heat transfer medium. In these, the storage medium is surrounded by a capsule wall of melamine/formaldehyde resin.

Melamine/formaldehyde resin microcapsules are likewise disclosed in U.S. Pat. No. 5,456,852, although these have a specific storage medium as core. However, such melamine/formaldehyde resin capsules display unsatisfactory hydrolysis stability over a prolonged period in the transport medium, which is generally aqueous.

U.S. Pat. No. 4,747,240 teaches the use, in gypsum plaster, of macroencapsulated storage substances which have a particle size above 1000 µm and whose capsule wall is a high-melting resin. However, capsules of this size require very thick walls to prevent them from being destroyed on mixing with the building materials.

EP-A-10 29 018 teaches the use of microcapsules having a capsule wall of highly crosslinked methacrylic ester polymer and a latent heat storage core in building cements/plasters. Thus, the microcapsules can be incorporated into gypsum plaster without influencing its properties.

An important building material is plasterboard. This is generally used in interior finishing of buildings for lining walls and ceilings. In this sector, too, there is a desire to increase thermal insulation and heat storage capacity. Such energy management is described in U.S. Pat. No. 5,501,268 which recommends plasterboard containing latent heat storage materials for this purpose. As latent heat storage material, a paraffin mixture is incorporated into the plasterboard. Precise details of the way in which it is added are not given.

U.S. Pat. No. 4,988,543 discusses the opportunities and problems in the incorporation of latent heat storage materials in plasterboard. Thus, macrocapsules could be located between the outer paperboard layers on the gypsum plaster mix. It is likewise possible for macrocapsules to be applied to the reverse side of the paperboard. It is conceivable that small spheres could be impregnated with latent heat storage materials and these spheres could be incorporated into the gypsum plaster mix or the latent heat storage materials could be mixed directly with the gypsum plaster mix. Finally, the entire, fabricated plasterboard could be impregnated with latent heat storage materials. U.S. Pat. No. 4,988,543 teaches that the use of capsules or spheres reduces the internal binding forces of the board. Likewise, processes in which the gypsum plaster is mixed directly with the latent heat storage materials are critical since adhesion problems with the paper also occur here. As a solution, U.S. Pat. No. 4,998,543 proposes spraying one side of the plasterboard with latent heat storage materials.

In the case of large areas of plasterboard which have been treated with unencapsulated latent heat storage materials, there is a risk of oil emissions into the air of the room. Furthermore, the latent heat storage materials in the liquid state start to flow slowly within the plasterboard, resulting in the long term in nonuniform distribution, in particular on the surface, known as "sweating", which likewise has an adverse effect on the stability of the boards.

SUMMARY OF THE INVENTION

It is an object of the present invention to find a way of incorporating latent heat storage materials into gypsum plasterboard while avoiding the abovementioned disadvantages.

We have found that this object is achieved by the use of microcapsules comprising latent heat storage materials as capsule core in plasterboard.

DETAILED DESCRIPTION OF THE PREFERRED EMBODIMENTS

Microcapsules are particles comprising a capsule core consisting predominantly, to an extent of more than 95% by weight, of latent heat storage materials and a polymer as capsule wall. The capsule core is solid or liquid depending on the temperature. The mean particle size of the capsules is from 0.5 to 100 µm, preferably from 1 to 80 µm, in particular from 1 to 50 µm.

Latent heat storage materials are generally lipophilic substances which have their solid/liquid phase transition in the temperature range from −20 to 120° C.

Examples of suitable substances are:

aliphatic hydrocarbon compounds such as saturated or unsaturated $C_{10}$–$C_{40}$-hydrocarbons which are branched or preferably linear, e.g. n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and cyclic hydrocarbons, e.g. cyclohexane, cyclooctane, cyclodecane;

aromatic hydrocarbon compounds such as benzene, naphthalene, biphenyl, o- or n-terphenyl, $C_1$–$C_{40}$-alkyl-substituted aromatic hydrocarbons such as dodecylbenzene, tetradecylbenzene, hexadecylbenzene, hexylnaphthalene or decylnaphthalene;

saturated or unsaturated $C_6$–$C_{30}$-fatty acids such as lauric, stearic, oleic or behenic acid, preferably eutectic mixtures of decanoic acid with, for example, myristic, palmitic or lauric acid;

fatty alcohols such as lauryl, stearyl, oleyl, myristyl and cetyl alcohols, mixtures such as coconut fatty alcohol and the oxo alcohols obtained by hydroformylation of α-olefins and further reactions;

$C_6$–$C_{30}$-fatty amines such as decylamine, dodecylamine, tetradecylamine or hexadecylamine;

esters such as $C_1$–$C_{10}$-alkyl esters of fatty acids, e.g. propyl palmitate, methyl stearate or methyl palmitate, and preferably their eutectic mixtures or methyl cinnamate;

natural and synthetic waxes such as montanic acid waxes, montanic ester waxes, carnauba wax, polyethylene wax, oxidized waxes, polyvinyl ether wax, ethylene-vinyl acetate wax or hard waxes from Fischer-Tropsch processes;

halogenated hydrocarbons such as chloroparaffin, bromooctadecane, bromopentadecane, bromononadecane, bromoeicosane, bromodocosane.

Mixtures of these substances are also suitable as long as the melting point is not reduced to outside the desired range or the heat of fusion of the mixture becomes too low for effective use.

For example, the abovementioned halogenated hydrocarbons can be incorporated as flame retardants. It is also possible to add flame retardants such as bis(pentabromophenyl) oxide, bis(tetrabromophenyl) oxide, antimony oxide or flame retardant additives described in U.S. Pat. No. 4,797, 160.

Furthermore, it is advantageous to add compounds which are soluble in the substances which form the capsule core to the substances so as to prevent the depression of the freezing point which sometimes occurs in the case of the nonpolar substances. It is advantageous to use, as described in U.S. Pat. No. 5,456,852, compounds which have a melting point which is from 20 to 120° C. higher than that of the actual core substance. Suitable compounds are the fatty acids, fatty alcohols, fatty amides and aliphatic hydrocarbon compounds mentioned above as lipophilic substances.

The lipophilic substances are selected according to the temperature range in which heat is to be stored. For example, for heat storage materials in building materials in Europe, preference is given to using lipophilic substances whose solid/liquid phase transition is in the temperature range from 0 to 60° C. Thus, individual materials or mixtures having transformation temperatures of from 0 to 25° C. are generally chosen for exterior applications, while materials having transformation temperatures of from 15 to 30° C. are generally chosen for interior applications. In the case of solar applications in conjunction. with building materials as storage medium or for avoiding overheating in the case of transparent thermal insulation, as described in EP-A 333 145, transformation temperatures of from 30 to 60° C. are especially useful. It is, for example, advantageous to use alkane mixtures as are obtained as industrial distillate and are commercially available as such.

As polymers for the capsule wall, it is in principle possible to use the materials known for the microcapsules in carbonless copying paper. It is thus possible, for example, to encapsulate the latent heat storage materials in gelatin together with other polymers by the methods described in GB-A 870476, U.S. Pat. No. 2,800,457, U.S. Pat. No. 3,041,289.

Preferred wall materials are thermoset polymers, because of their very good aging stability. For the purposes of the present invention, thermoset polymers are wall materials which, owing to their high degree of crosslinking, do not soften but instead decompose-at high temperatures. Suitable thermoset wall materials are, for example, formaldehyde resins, polyureas and polyurethanes and also highly crosslinked methacrylic ester polymers.

Formaldehyde resins are reaction products of formaldehyde with triazines such as melamine, carbamides such as urea, phenols such as phenol, m-cresol and resorcinol, amino and amido compounds such as aniline, p-toluenesulfonamide, ethylenurea and guanidine, or mixtures thereof.

Preferred formaldehyde resins are urea-formaldehyde resins, urea-resorcinol-formaldehyde resins, urea-melamine resins and melamine-formaldehyde resins. Preference is likewise given to the $C_1$–$C_4$-alkyl ethers, in particular methyl ethers, of these formaldehyde resins and also their mixtures with these formaldehyde resins. Particular preference is given to melamine-formaldehyde resins and/or their methyl ethers.

In the processes known from carbonless copying paper, the resins used are prepolymers. The prepolymer is still soluble in the aqueous phase and during the course of polycondensation migrates to the interface and encloses the oil droplets. Microencapsulation processes using formaldehyde resins are generally known and are described, for example, in EP-A-562 344 and EP-A-974 394.

Capsule walls comprising polyureas and polyurethanes are likewise known from carbonless copying paper. The capsule walls are formed by reaction of reactants bearing $NH_2$ groups or OH groups with diisocyanates and/or polyisocyanates. Examples of suitable isocyanates are ethylene diisocyanate, tetramethylene 1,4-diisocyanate, hexamethylene 1,6-diisocyanate and tolylene 2,4- and 2,6-diisocyanate. Further polyisocyanates which may be mentioned are derivatives having a biuret structure, polyuretonimines and isocyanurates. Possible reactants are: hydrazine, guanidine and its salts, hydroxylamine, diamines and polyamines and amino alcohols. Such interfacial polyaddition processes are known, for example, from U.S. Pat. No. 4,021,595, EP-A 0 392 876 and EP-A 0 535 384.

Preference is given to microcapsules whose capsule wall is a highly crosslinked methacrylic ester polymer. The degree of crosslinking is achieved using a proportion of crosslinker of ≧10% by weight, based on the total polymer.

The walls of the preferred microcapsules are built up from 30 to 100% by weight, preferably from 30 to 95% by weight, of one or more $C_1$–$C_{24}$-alkyl esters of acrylic acid and/or methacrylic acid as monomers I. In addition, the microcapsule walls can be built up from up to 80% by weight, preferably from 5 to 60% by weight, in particular from 10 to 50% by weight, of one or more bifunctional or polyfunctional monomer as monomer II which is insoluble or sparingly soluble in water, and up to 40% by weight, preferably up to 30% by weight, of other monomers III.

Suitable monomers I are $C_1$–$C_{24}$-alkyl esters of acrylic acid and/or methacrylic acid. Particularly preferred monomers I are methyl acrylate, ethyl acrylate, n-propyl acrylate and n-butyl acrylate and/or the corresponding methacrylates. Preference is given to isopropyl acrylate, isobutyl acrylate, sec-butyl acrylate and tert-butyl acrylate and the corresponding methacrylates. Mention may also be made of methacrylonitrile. In general, the methacrylates are preferred.

Suitable monomers II are bifunctional or polyfunctional monomers which are insoluble or sparingly soluble in water but have a good to limited solubility in the lipophilic substance. For the purposes of the present invention, sparing solubility is a solubility of less than 60 g/l at 20° C.

For the purposes of the present invention, bifunctional or polyfunctional monomers are compounds which have at least 2 nonconjugated ethylenic double bonds.

Particular mention may be made of divinyl and polyvinyl monomers which effect crosslinking of the capsule wall during the polymerization.

Preferred bifunctional monomers are diesters of diols with acrylic acid or methacrylic acid, also the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol diacrylate, butanediol diacrylate, pentanediol diacrylate and hexanediol diacrylate or the corresponding methacrylates.

Preferred polyvinyl monomers are trimethylolpropane triacrylate and trimethacrylate, pentaerythritol triallyl ether and pentaerythritol tetraacrylate.

Possible monomers III are other monomers; preference is given to monomers IIIa such as styrene, α-methylstyrene, α-methylstyrene, butadiene, isoprene, vinyl acetate, vinyl propionate and vinylpyridine.

Particular preference is given to the water-soluble monomers IIIb, e.g. acrylonitrile, methacrylamide, acrylic acid, methacrylic acid, itaconic acid, maleic acid, maleic anhydride, N-vinylpyrrolidone, 2-hydroxyethyl acrylate and methacrylate and acrylamido-2-methylpropanesulfonic acid. In addition, mention may be made of, in particular, N-methylolacrylamide, N-methylolmethacrylamide, dimethylaminoethyl methacrylate and diethylaminoethyl methacrylate.

The microcapsules suitable for use according to the present invention can be produced by in-situ polymerization. The preferred microcapsules and their production are known from EP-A-457 154, which is hereby expressly incorporated by reference. Thus, the microcapsules are produced by preparing a stable oil-in-water emulsion from the monomers, a free-radical initiator, a protective colloid and the lipophilic substance to be encapsulated, with these being present as disperse phase in the emulsion. The proportion of oil phase in the oil-in-water emulsion is preferably from 20 to 60% by weight.

The polymerization of the monomers is subsequently triggered by heating, and the resulting polymers form the capsule wall which encloses the lipophilic substance.

In general, the polymerization is carried out at from 20 to 100° C., preferably from 40 to 80° C. The dispersion temperature and polymerization temperature should naturally be above the melting point of the lipophilic substances, so that free-radical initiators whose decomposition temperature is above the melting point of the lipophilic substance may be chosen.

The reaction times of the polymerization are normally from 1 to 10 hours, usually from 2 to 5 hours.

The polymerization process is generally carried out by dispersing a mixture of water, monomers, protective colloids, the lipophilic substances, free-radical initiators and, if desired, regulators either in succession or simultaneously and, while stirring vigorously, heating the dispersion to the decomposition temperature of the free-radical initiators. The polymerization rate can be controlled by selection of the temperature and of the amount of free-radical initiator. The reaction is advantageously started by increasing the temperature to a start temperature and the polymerization is controlled by increasing the temperature further.

After reaching the final temperature, the polymerization is advantageously continued for a time of up to about 2 hours to reduce the residual monomer contents.

Subsequent to the actual polymerization reaction to a conversion of from 90 to 99% by weight, it is generally advantageous to substantially free the aqueous microcapsule dispersions of odor-imparting substances, e.g. residual monomers and other volatile organic constituents. This can be achieved in a manner known per se by physical means by distillation (in particular steam distillation) or by stripping with an inert gas. It can also be achieved by chemical means as described in WO 9924525, advantageously by redox-initiated polymerization as described in DE-A-4 435 423, DE-A-4419518 and DE-A-44 35 422.

In this way, microcapsules having a mean particle size (z-mean, determined by pseudoelastic, dynamic light scattering) in the range from 0.5 to 100 μM can be produced. Capsules of this-size are preferred for use according to the present invention.

Preferred protective colloids are water-soluble polymers, since these reduce the surface tension of water from a maximum of 73 mN/m to from 45 to 70 mN/m and thus ensure the formation of closed capsule walls and of microcapsules having preferred particle sizes of from 1 to 30 μm, preferably from 3 to 12 μm.

In general, the microcapsules are produced in the presence of at least one organic protective colloid which may be either anionic or uncharged. Anionic and nonionic protective colloids can also be used together. Preference is given to using inorganic protective colloids, if desired in admixture with organic protective colloids.

Uncharged organic protective colloids-are cellulose derivatives such as hydroxyethylcellulose, carboxymethylcellulose and methylcellulose, polyvinylpyrrolidone, copolymers of vinylpyrrolidone, gelatin, gum arabic, xanthan gum, sodium alginate, casein, polyethylene glycols, preferably polyvinyl alcohol and partially hydrolyzed polyvinyl acetates.

To improve the stability of the emulsions, anionic protective colloids can be added. The use of anionic protective colloids is particularly important when the dispersion has a high content of microcapsules, since formation of agglomerated microcapsules can occur without an additional ionic stabilizer. These agglomerates reduce the yield of usable microcapsules-if the agglomerates comprise small capsules having a diameter of from 1 to 3 μm, and they increase the susceptibility to fracture if the agglomerates are larger than about 10 μm.

Suitable anionic protective colloids are polymethacrylic acid and copolymers of sulfoethyl acrylate and methacrylate, sulfopropyl acrylate and methacrylate, N-(sulfoethyl) maleimide, 2-acrylamido-2-alkylsulfonic acids, styrenesulfonic acid or vinylsulfonic acid.

Preferred anionic protective colloids are naphthalenesulfonic acid and naphthalenesulfonic acid-formaldehyde condensates and especially polyacrylic acids and phenolsulfonic acid-formaldehyde condensates.

The anionic protective colloids are generally used in amounts of from 0.1 to 10% by weight, based on the aqueous phase of the emulsion.

Preference is given to inorganic protective colloids, known as Pickering systems, which make it possible to stabilize very fine solid particles and are insoluble but dispersible in water or are insoluble and nondispersible in water but can be wetted by the lipophilic substance.

Microencapsulation processes using such Pickering systems are described, for example, in U.S. Pat. Nos. 3,615,972 and U.S. Pat. No 4,016,110.

A Pickering system can consist of solid particles alone or additionally of auxiliaries which improve the dispersibility of the particles in water or improve the ability of the lipophilic phase to wet the particles. These auxiliaries are, for example, nonionic, anionic, cationic or zwitterionic surfactants or polymeric protective colloids as are described above or below. Buffer substances can additionally be added to set particular pH values of the aqueous phase which are advantageous in each case. This can reduce the water solubility of the fine particles and increase the stability of the emulsion. Customary buffer substances are phosphate buffers, acetate buffers and citrate buffers.

The fine, solid particles can be metal salts, e.g. salts, oxides and hydroxides of calcium, magnesium, iron, zinc, nickel, titanium, aluminum, silicon, barium and manganese. Mention may be made of magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcite may likewise be mentioned. Particular preference is given to finely divided silicas, magnesium pyrophosphate and tricalcium phosphate.

The Pickering systems can either be added initially to the aqueous phase, or they can be added to the stirred emulsion of oil-in-water. Some fine, solid particles are prepared by precipitation. Thus, magnesium pyrophosphate is prepared by combining aqueous solutions of sodium pyrophosphate and magnesium sulfate.

In general, the pyrophosphate is prepared immediately before dispersion by combining an aqueous solution of an alkali metal pyrophosphate with at least the stoichiometrically required amount of a magnesium salt, with the magnesium salt being able to be present in solid form or as an aqueous solution. In a preferred embodiment, the magnesium pyrophosphate is prepared by combining aqueous solutions of sodium pyrophosphate ($Na_4P_2O_7$) and magnesium sulfate ($MgSO_4.7H_2O$).

The finely divided silicas can be dispersed in water as fine, solid particles. However, it is also possible to use colloidal dispersions of silica in water. The colloidal dispersions are alkaline, aqueous mixtures of silica. In the alkaline pH range, the particles are swollen and stable in water. For these dispersions to be used as a Pickering system, it is advantageous for the pH of the oil-in-water emulsion to be adjusted to from 2 to 7 by means of an acid.

The inorganic protective colloids are generally used in amounts of from 0.5 to 15% by weight, based on the aqueous phase.

In general, the uncharged organic protective colloids are used in amounts of from 0.1 to 15% by weight, preferably from 0.5 to 10% by weight, based on the aqueous phase.

The dispersion conditions for preparing the stable oil-in-water emulsion are preferably selected in a manner known per se so that the microcapsules have a mean diameter of from 1 to 35 μm, preferably from 3 to 10 μm.

The microcapsules can be incorporated as a powder or as a dispersion into the plasterboard. Here, preference is given to incorporating from 5 to 40% by weight, in particular from 20 to 35% by weight, of microcapsules, based on the total weight of the plasterboard (dry basis).

The plasterboard of the present invention comprises a gypsum plaster core and paperboard sheets applied to both sides.

Plasterboard is usually produced by introducing an aqueous plaster of Paris mix discontinuously or continuously between two paperboard sheets having a cellulose basis, thus producing boards. The plaster of Paris mix is, as is generally known, produced by continuous addition of calcium sulfate β-hemihydrate to water containing additives while mixing continually. The microcapsules can either be added together with the calcium sulfate or they can be present beforehand as an aqueous dispersion. The aqueous dispersion is preferably mixed with the calcium sulfate, since this can be metered particularly well in this way. The plaster of Paris mix obtained is applied to the paperboard sheets, for example sprayed on, and covered with paperboard.

During initial curing, the plasterboards are shaped in a press to form strips having, for example, a width of 1.2–1.25 m and a thickness of 9.25, 12.5, 15.0, 18.0 or 25 mm. These strips harden within a few minutes and are cut into boards. In this state, one third of the weight of the boards is generally still free water. To remove the remaining water, the boards are subjected to a heat treatment at about 250° C. This is carried out, for example, in tunnel driers. The plasterboards obtained in this way have a density of 750–950 kg/m$^3$.

Preference is given to plasterboard in which the paperboard used has a thickness of from 0.2 to 1 mm and/or a grammage of from 100 to 500 g/m$^2$.

It is usual to use paperboard having a grammage of about300 g/m$^2$ for plasterboard. Paperboard of this type is usually produced in a plurality of layers, with the final layer representing the outer covering layer of the paperboard, and has a grammage of from 10 to100 g/m$^2$, preferably from 30 to 70 g/m$^2$.

Apart from this conventional paperboard, it is also possible to use paperboard sheets in which the outer covering layers of both paperboard sheets, the intermediate layers or the entire paperboard sheets contain 10–90% by weight, preferably 40–70% by weight, of polyolefin fibrils.

The heat treatment at about 250° C. required for the production of the plasterboard results in a surface temperature on the boards after evaporation of the water which is sufficient to plasticize the polyolefin fibrils and conglutinate with the other paperboard components. This results in substantial closure of the pores on the outer layer of the paperboard and the surface of the plasterboard becomes water-resistant. This pore-closing conglutination occurs only when all the water has evaporated, since before this the temperature cannot exceed 100° C. in the board because of generation of water vapor. Following the heat treatment by a hot gas treatment with a gas at from 130° to 300° C., preferably from 140 to 200° C., can improve the effect further. The treatment with hot gas can also, regardless of the heat treatment during manufacture, be carried out at a later point in time. Instead of a hot gas treatment, it is also possible to use a smooth or embossed roller whose temperature is above the softening point of the polyolefin fibrils.

In one embodiment, the plasterboard is produced using paperboard whose total mass or the individual layers, but preferably the outer covering layer, comprises a mixture of 90–10% by weight, preferably 60–30% by weight, of cellulose fibers and 10–90% by weight, preferably 40–70% by weight, of polyolefin fibrils, based on the dry weight.

Polyolefin fibrils are polyolefin fibers which are, for example, produced by a decompression evaporation process in which a pressurized, superheated emulsion comprising
a) a solution of a polyolefin in a low-boiling solvent and
b) an aqueous solution of a hydrophilicizing agent is sprayed through a nozzle into a low-pressure zone, with the hydrophilicizing agent being used in an amount of 0.2–3% by weight, preferably 0.5–2% by weight, based on the polyolefin.

Particularly useful polyolefins are polyethylene having a reduced specific viscosity of from 0.3 to 30 dl/g, preferably from 0.7 to 10 dl/g (determined by the method of H. Weslau, Kunststoffe 49 (1959), p. 230) and a density of from 0.93 to 0.97 g/cm$^3$, and polypropylene. These polyolefins may contain small amounts of comonomers having from 3 to 6 carbon atoms.

Suitable hydrophilicizing agents encompass, in principle, all known types of emulsifiers, but preference is given to using polymeric hydrophilicizing agents containing amine groups, amide groups, carboxyl groups and/or hydroxyl groups. Very good results are obtained, in particular, using polyvinyl alcohol having a solution viscosity (measured in a 4% strength solution in water at 20° C.) of from 4 to 70 cP and a degree of saponification of from 80 to 99.5%.

Methods of producing polyolefin fibrils may be found, for example, in DE-A-2718322.

It has been found that paperboard containing polyolefin fibrils can be processed particularly advantageously with the microcapsule-containing gypsum plaster and displays particularly good binding forces.

In place of paperboard having a cellulose basis, it is also possible to use alternative, fibrous sheets to cover both sides of the plasterboard of the present invention. Alternative materials are polymer fibers made of, for example, polypropylene, polyester, polyamide, polyacrylates, polyacrylonitrile and the like. Glass fibers are also suitable. The alternative materials can be used as woven fabrics and as nonwovens.

Such plasterboards are known, for example, from U.S. Pat. Nos. 4,810,569, 4,195,110 and 4,394,411.

High proportions of microcapsules in the gypsum plaster can sometimes lead to hydrophobicization of the gypsum-based building material. This can sometimes also result in poorer adhesion to the substrates onto which these modified gypsum plasters are applied, for example adhesion to the paperboard can be impaired.

It has now been found that stronger adhesion to substrates such as paperboard can be achieved by addition of natural and/or synthetic polymers. Suitable water-soluble polymers are: starches and starch ethers, relatively high molecular weight methylcelluloses and other cellulose derivatives, guar gum derivatives, thermoplastic dispersion powders and liquid dispersions based on vinyl acetate, ethylene-vinyl acetate, vinyl propionate, styrene-butadiene, styrene acrylate and pure acrylate. The amount of the polymers added is from 0,1 to 5% by weight, based on the total dry weight of plaster of Paris and latent heat storage material. The polymers mentioned improve not only the adhesion to the substrate, i.e. the paperboard, but usually also increase the fracture strength and flexural strength of the plasterboard of the present invention. Preference is given to plasterboard whose gypsum plaster contains from 0.1 to 5% by weight, based on the total dry weight of gypsum plaster and latent heat storage material, of water-soluble polymers.

Furthermore, it is advantageous to add water retention aids and/or thickeners as further additives to the gypsum plaster compositions. Examples are polyvinyl alcohol, cellulose derivatives such as hydroxyethylcellulose, hydroxypropylcellulose, carboxymethylcellulose, polyacrylic acid and copolymers of acrylic acid, e.g. polyethylene-co-acrylic acid, polymaleic acid-co-acrylic acid, polyisobutylene-co-acrylic acid and acrylic acid-rich polymer dispersions with styrene or acrylic esters or vinyl acetate, as are used as thickeners for, for example, paper finishing. The water retention aids and/or thickeners are usually used in amounts of from 0.05 to 2% by weight, based on the total dry weight of gypsum plaster and latent heat storage material. The gypsum plaster which has been modified in this way displays excellent processing properties.

For this reason, preference is given to plasterboard whose gypsum plaster contains from 0.05 to 2% by weight of water retention aid or thickener, based on the total dry weight of gypsum plaster and latent heat storage material.

The present invention further provides a process for producing plasterboard comprising a gypsum plaster core and paperboard sheets applied to both sides, by introducing an aqueous slurry of plaster of Paris between two paperboard sheets having a cellulose basis and heat treating the boards formed in this way, wherein the slurry of plaster of Paris comprises microcapsules/calcium sulfate hemihydrate in a weight ratio of from 5/95 to 40/60.

The plasterboard of the present invention has good heat storage properties. The boards have good mechanical strength and display good storage properties. Furthermore, no outward migration of heat storage waxes is observed.

The plasterboard is suitable for wall and ceiling elements for the interior finishing of buildings. The following examples illustrate the invention.

The percentages in the examples are by weight. The K values reported in the examples were determined by the method of H. Fikentscher, Cellulose-Chemie, vol. 13, 58–64 and 71–74 (1932), in 1% strength aqueous solution at 25° C.

Production of the Microcapsules

Aqueous Phase:
930 g of water
263 g of a 30% strength colloidal dispersion of $SiO_2$ in water at a pH of 9.8 (12 nm, 240 $m^2/g$)
18.2 g of a 20% strength aqueous solution of a polymer derived from 59% of 2-acrylamido-2-methylpropane-sulfonic acid sodium salt, 20% of acrylic acid, 20% of methyl acrylate and 1% of styrene, K=69
10.5 g of a 2.5% strength aqueous solution of potassium dichromate Oil Phase:
1100 g of $C_{18}$–$C_{20}$-alkane (industrial distillate)
129.5 g of methyl methacrylate
57.4 g of butanediol diacrylate
1.9 g of ethylhexyl thioglycolate
2.3 g of t-butyl perpivalate
Feed stream 1: 2.73 g of t-butyl hydroperoxide, 70% strength in water
Feed stream 2: 0.84 g of ascorbic acid, 0.061 g of NaOH, 146 g of $H_2O$ The above aqueous phase was placed in a reaction vessel at room temperature and the pH was adjusted to 7 by means of 14 g of 10% strength hydrochloric acid. After addition of the oil phase, the latter was dispersed by means of a high-speed stirrer at 4200 rpm and the pH was adjusted to 4 by means of 15 g of 10% strength hydrochloric acid. After the mixture had been dispersed for 40 minutes, a stable emulsion having a particle diameter of from 2 to 8 μm was obtained. While stirring with an anchor stirrer, the emulsion was heated to 56° C. over a period of 4 minutes, to 58° C. over a further period of 20 minutes, to 71° C. over a further period of 60 minutes and to 85° C. over a further period of 60 minutes. The resulting microcapsule dispersion was cooled to 70° C. while stirring and feed stream 1 was added. While stirring at 70° C., feed stream 2 was metered in over a period of 80 minutes. The mixture was subsequently cooled. The resulting microcapsule dispersion had a solids content of 45.7% and a mean particle size D(4.3) =4.22 μm.

The dispersion could be dried without problems in a laboratory spray drier using a two-fluid nozzle and cyclone precipitation at an inlet temperature of the hot gas of 130° C. and an exit temperature of the powder from the spray drier of 70° C. On heating in a differential scanning calorimeter at a heating rate of 1 K/minute, microcapsule dispersion and powder displayed a melting point in the range from 26.5 to 29.5° C. and a transformation enthalpy of 130 J/g of alkane mixture.

Production of the plasterboard

A mixture of 750 g of plaster of Paris (calcium sulfate β-hemihydrate), 250 g of microcapsule powder containing latent heat storage material from the example above and 2 g of Culminal MC 7000 PF (methylcellulose, from Aqualen) is mixed with 850 g of water to give a uniform slurry and the mixture is immediately poured onto a sheet of paperboard having a grammage of 300 g/m$^2$ and covered with a second sheet of paperboard and smoothed to a thickness of 12 mm. After a solidification time of 10 minutes, the board is dried at 200° C. in a drying oven for 15 minutes.

The plasterboard manufactured in this way has a normal appearance, the microcapsules are not broken and the measured heat storage capacity at 20–30° C. corresponds to the calculated proportion of latent heat storage material added.

We claim:

1. A latent heat storage article, comprising:
    a plasterboard comprising at least two fibrous sheets and a gypsum plaster core between any two adjacent fibrous sheets, each gypsum plaster core containing microcapsules of at least one organic lipophilic substance having its solid/liquid phase transition in the temperature range of −20 to 120° C. encapsulated in a shell of a thermoset polymer.

2. The latent heat storage article as claimed in claim 1, wherein the microcapsules have a mean particle size ranging from 0.5 to 100 μm.

3. The latent heat storage article as claimed in claim 1, wherein the thermoset polymer is a formaldehyde resin, a polyurea, a polyurethane or a cross-linked methacrylic ester polymer.

4. The latent heat storage article as claimed in claim 1, wherein the thermoset polymer is prepared by free-radical polymerization of a monomer mixture comprising:
    from 30 to 100% by weight, based on the total weight of the monomers, of one or more $C_1$–$C_{24}$-alkyl esters of acrylic acid and/or methacrylic acid (monomer I),
    from 0 to 80% by weight, based on the total weight of the monomers, of one or more bifunctional or polyfunctional monomers (monomers II) which are insoluble or sparingly soluble in water and
    from 0 to 40% by weight, based on the total weight of the monomers, of other monomers (monomers III).

5. The latent heat storage article as claimed in claim 1, wherein the amount of said microcapsules in the plasterboard ranges from 5 to 40% by weight, based on the weight of the plasterboard.

6. The latent heat storage article as claimed in claim 5, wherein the amount of said microcapsules in the plasterboard ranges from 20 to 35% by weight.

7. The latent heat storage article as claimed in claim 1, wherein the plasterboard has a density of 750–950 kg/m$^3$.

8. The latent heat storage article as claimed in claim 1, wherein the paperboard of the plasterboard has a thickness ranging from 0.2 to 1 mm and/or a grammage of 100 to 500 g/m$^2$.

9. The latent heat storage article as claimed in claim 1, wherein the at least two fibrous sheets are made of glass fibers.

10. The latent heat storage article as claimed in claim 1, wherein the at least two fibrous sheets are made of polymer fibers.

11. A process for producing latent heat storage article, comprising:
    introducing an aqueous slurry of plaster of Paris between two paperboard sheets having a cellulose basis, wherein the slurry of plaster of Paris of calcium sulfate hemihydrate contains microcapsules of at least one organic lipophilic substance having its solid/liquid phase transition in the temperature range of −20 to 120° C. encapsulated in a shell of a thermoset polymer, the weight ratio of microcapsules to calcium sulfate hemihydrate ranging from 5/95 to 40/60; and
    heat treating the plasterboard that is obtained.

12. A process for producing latent heat storage article, comprising:
    introducing an aqueous slurry of plaster of Paris between two glass fiber sheets, wherein the slurry of plaster of Paris of calcium sulfate hemihydrate contains microcapsules of at least one organic lipophilic substance having its solid/liquid phase transition in the temperature range of −20 to 120° C. encapsulated in a shell of a thermoset polymer, the weight ratio of microcapsules to calcium sulfate hemihydrate ranging from 5/95 to 40/60; and
    heat treating the plasterboard that is obtained.

13. A latent heat storage article which is a plasterboard comprising at least two fibrous sheets and a gypsum plaster core between any two adjacent fibrous sheets, each gypsum plaster core consisting essentially of gypsum and microcapsules of at least one organic lipophilic substance having its solid/liquid phase transition in the temperature range of −20 to 120° C. encapsulated in a shell of a thermoset polymer.

14. A latent heat storage article, comprising:
    a plasterboard comprising at least two fibrous sheets and a gypsum plaster core between any two adjacent fibrous sheets, each gypsum plaster core containing microcapsules of at least one organic lipophilic substance having its solid/liquid phase transition in the temperature range of 15 to 30° C. encapsulated in a shell of a thermoset polymer.

15. A latent heat storage article, comprising:
    a plasterboard comprising at least two fibrous sheets and a gypsum plaster core between any two adjacent fibrous sheets, each gypsum plaster core containing microcapsules of at least one organic lipophilic substance having its solid/liquid phase transition in the temperature range of 30 to 60° C. encapsulated in a shell of a thermoset polymer.

* * * * *